United States Patent [19]

Vermaire et al.

[11] Patent Number: 5,431,895
[45] Date of Patent: Jul. 11, 1995

[54] PROCESS FOR THE REMOVAL OF LEAD AND CADMIUM FROM PHOSPHORIC ACID

[75] Inventors: Dirk C. Vermaire; Bernardus J. Damman, both of Middelburg, Netherlands; Horst Bennoit, Völingen, Germany

[73] Assignee: Hoechst Aktiengesellschaft, Frankfurt am Main, Germany

[21] Appl. No.: 284,088

[22] Filed: Aug. 1, 1994

[30] Foreign Application Priority Data

Aug. 14, 1993 [DE] Germany ............... 43 27 401.3

[51] Int. Cl.[6] .................................................. C01B 25/16
[52] U.S. Cl. .................................................... 423/321.1
[58] Field of Search ...................................... 423/321.1

[56] References Cited

U.S. PATENT DOCUMENTS

| | | | |
|---|---|---|---|
| 1,787,192 | 12/1930 | Fiske | 423/321.1 |
| 3,764,655 | 10/1973 | Ehlers et al. | 423/321.1 |
| 4,134,962 | 1/1979 | Ehlers et al. | 423/321.1 |
| 4,378,340 | 3/1983 | Berglund | 423/321.1 |
| 4,642,224 | 2/1987 | Ressel et al. | 423/321.1 |
| 4,670,244 | 6/1987 | Roos et al. | 423/321.1 |
| 4,769,226 | 9/1988 | Winand et al. | 423/321.1 |
| 4,777,028 | 10/1988 | Schrodter | 423/321.1 |

FOREIGN PATENT DOCUMENTS 42 30 223.4 9/1992 Germany.

*Primary Examiner*—Wayne Langel
*Attorney, Agent, or Firm*—Connolly & Hutz

[57] ABSTRACT

To remove lead and cadmium from phosphoric acid, alkali solution and aqueous sulfide solution are simultaneously introduced with thorough mixing into a phosphoric acid having a $P_2O_5$ content of up to 32% by weight, an iron content of up to 0.3% by weight and an alkali/P ratio of up to 0.30. The temperature of the phosphoric acid which is thoroughly mixed with alkali solution and sulfide solution is adjusted to temperatures of 58° to 72° C. with escape of the excess hydrogen sulfide. To complete the sulfide precipitation, the temperature is lowered to below 45° C. Finally, the precipitated sulfides of the lead and cadmium are separated off from the phosphoric acid.

17 Claims, 1 Drawing Sheet

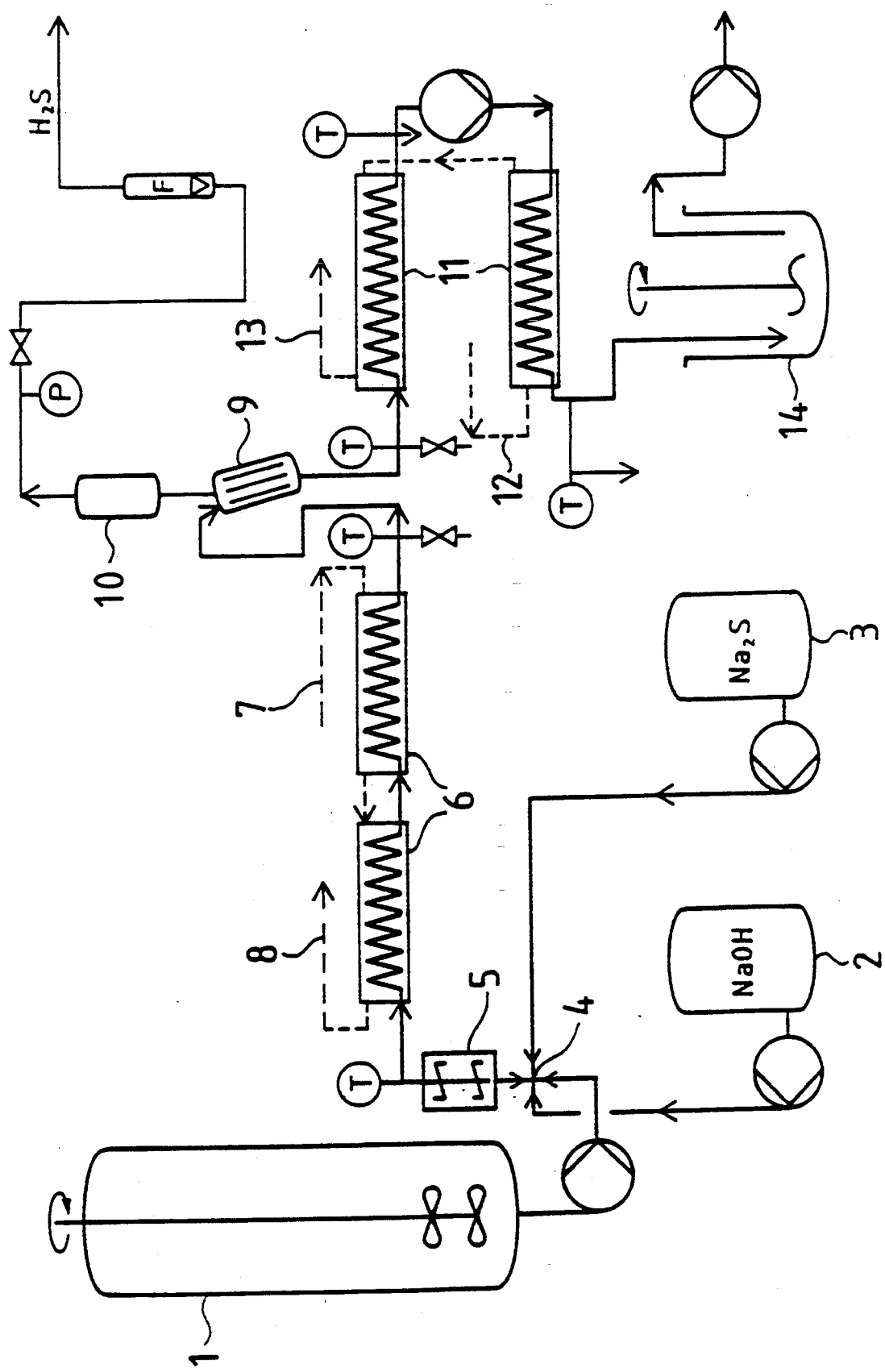

PROCESS FOR THE REMOVAL OF LEAD AND CADMIUM FROM PHOSPHORIC ACID

The present invention relates to a process for removing lead and cadmium from phosphoric acid, in particular from phosphoric acid of the the which is obtained in the decomposition of dusts which have been separated off in the electrostatic separator during the preparation of yellow phosphorus in the electrothermal reduction furnace.

The unpublished German Patent Application P 42 30 223.4 discloses a process for removing lead, cadmium and zinc from dusts from the electrothermal preparation of yellow phosphorus, in which the dusts are first decomposed with at least 25% strength by weight phosphoric acid at above 60° C. in an aerated reaction zone. The decomposition solution is then separated into a lead-, cadmium- and zinc-free residue and into a phosphoric acid containing lead, cadmium and zinc in dissolved form.

It is the object of the present invention to indicate a process for the removal of lead and cadmium from phosphoric acid which, in addition to these metals, still contains zinc and iron in dissolved form. This is achieved according to the invention by simultaneously introducing alkali solution and aqueous sulfide solution with thorough mixing into phosphoric acid having a $P_2O_5$ content of up to 32% by weight, an iron content of up to 0.3% by weight and an alkali/P ratio of up to 0.30; by adjusting the temperature of the phosphoric acid which is thoroughly mixed with alkali solution and sulfide solution to temperatures of 58° to 72° C. with escape of the excess hydrogen sulfide; by lowering the temperature to below 45° C. to complete the sulfide precipitation and by finally separating off the precipitated sulfides of the lead and cadmium from the phosphoric acid.

A further alternative embodiment of the process according to the invention can also be that a) a reductant is first added to the phosphoric acid;
b) the reductant used is zero-valent iron;
c) the alkali solution has a concentration of up to 50% by weight;
d) the sulfide solution contains 2 to 8% by weight, preferably 4 to 6% by weight, of sulfide;
e) the introduction of alkali solution and sulfide solution is carried out separately and simultaneously underneath the liquid surface of the phosphoric acid;
f) the alkali/P ratio during the sulfide precipitation is 0.40 to 0.65, preferably 0.45 to 0.55;
g) sulfide is added according to the formula:

$$S\,add = \frac{[S^{2-}]}{[Pb^{2+}] + [Cd^{2+}]}$$

where S add is at least 3;
h) the separation of the precipitated sulfides is carried out after addition of a flocculating agent;
i) the separation of the sulfides is carried out using a centrifugal separator.

BRIEF DESCRIPTION OF DRAWING the sole FIGURE of the Drawing is a schematic representation of a plant used for carrying out the process according to the present invention.

As a small proportion of the lead contained in the phosphoric acid can be radioactive (lead 210 and derivatives from the crude phosphate), a complete removal in as concentrated a form as possible is necessary, i.e. the lead sulfide precipitate should contain, in addition to the unavoidably coprecipitating cadmium sulfide, as little zinc sulfide as possible (less than 10% by weight) and if possible no elemental sulfur.

In the process according to the invention, the coprecipitation of zinc sulfide is successfully reduced on the one hand by precipitation in the acid range (alkali/P ratio of about 0.5) and on the other hand by the low sulfide ion concentration in the phosphoric acid during precipitation in the temperature range below 45° C.

In the process according to the invention, the trivalent iron contained in the phosphoric acid can be converted into divalent iron by addition of a reductant, for example of metallic iron or ferrophosphorus. By this means, the oxidation of sulfide ions to sulfur by trivalent iron can be prevented.

As a result of the simultaneous introduction of alkali solution and sulfide solution into the phosphoric acid in the process according to the invention, precipitation of lead monohydrogenphosphate ($PbHPO_4$) during the rise in the alkali/P ratio is prevented.

In the process according to the invention, the lead content of the phosphoric acid is reduced to below 5 ppm, while in the filter cake the lead, which is partially present in radioactive form, is enriched in the concentration range above 40%.

In the process according to the invention, the excess hydrogen sulfide is blown out at temperatures of up to 75° C.

In the process according to the invention, the alkali/P ratio indicates the degree of neutralization of the phosphoric acid (moles of alkali per mole of phosphoric acid present). At high acid and salt concentrations, the alkali/P ratio is a suitable alternative to pH measurement. In this case, the alkali/P ratio of a solution with alkali/P < 1 is determined by titrating the solution, after diluting with water, with adjusted alkali solution up to the end points of the molar ratio alkali/P = 1 (pH 4.5) or alkali/P = 2 (pH 9.5) and employing the amounts of solution consumed in the formula $$alkali/P = 1 - \frac{\text{consumption of alkali solution up to pH 4.5}}{\text{consumption of alkali solution between pH 4.5 and pH 9.5}}$$

The process according to the invention can be carried out in a plant which is schematically represented in the attached FIGURE:

in the recipient vessel i is found phosphoric acid, in which, inter alia, lead, cadmium, zinc and iron are dissolved. A sodium hydroxide solution tank 2, a container 3 for sulfide solution and the recipient vessel 1 are connected flow-wise to a static mixer 5 via a four-way valve 4. The mixture emerging from the static mixer 5 passes into the first pair of condensers 6 with coolant inlet 7 and coolant outlet 8. The pair of condensers 6 is connected flow-wise to a deaerating vessel 9, which for its part is connected to a foam breaker 10. The outlet from the deaerating vessel 9 passes into a second pair of condensers 11, which is provided with a coolant inlet 12 and with a coolant outlet 13. From the second pair of condensers 11, the phosphoric acid containing lead sulfide and cadmium sulfide runs into a collection vessel 14 provided with a stirrer, from which the suspension is pumped to a filter.

Example 1 (Comparison Example)

From the recipient vessel I (compare the FIGURE), 47.4 l/h of phosphoric acid which contained
- 32.9% by weight of $P_2O_5$
- 511 ppm of Pb
- 212 ppm of Cd
- 2386 ppm of Zn and had an Na/P ratio of 0.37, together with 1.8 l/h of 50% strength by weight sodium hydroxide solution and 1.2 l/h of 5% strength by weight sodium sulfide solution (S add=2.7) were fed to the static mixer 5. The resulting mixture was passed into the first pair of condensers at a temperature of 73° C.; on its exit the mixture had a temperature of 68° C. After passing through the deaerating vessel 9, the mixture was passed at a temperature of 67° C. through the second pair of condensers 11, which it left at a temperature of 43° C. The mixture withdrawn from the collection vessel 14 was filtered.

The filtrate contained
- 30.9% of $P_2O_5$
- 12.3 ppm of Pb
- 0.5 ppm of Cd
- 2039 ppm of Zn and had an Na/P ratio of 0.52.

The filter cake contained:
- 38.8% of Pb
- 18.6% of Cd
- 7.4% of Zn
- 0.14% of Fe
- 31% of total S (of which 14.9% was sulfide S)
- 3.2% of $P_2O_5$.

Example 2 (Comparison Example)

From the recipient vessel 1 (compare the FIGURE), 48.0 l/h of phosphoric acid which contained
- 30.5% by weight of $P_2O_5$
- 488 ppm of Pb
- 188 ppm of Cd
- 2360 ppm of Zn and had an Na/P ratio of 0.37, together with 2.3 l/h of 50%strength by weight sodium hydroxide solution and 2.1l/h of 5% strength by weight sodium sulfide solution (S add=5.0) were fed to the static mixer 5. The resulting mixture was passed into the first pair of condensers at a temperature of 73° C.; on its exit the mixture had a temperature of 58° C. After passing through the deaerating vessel 9, the mixture was passed at a temperature of 56° C. through the second pair of condensers 11, which it left at a temperature of 38° C. The mixture withdrawn from the collection vessel 14 was filtered.

The filtrate contained
- 28.7% of $P_2O_5$
- 1.7 ppm of Pb
- 0.0 ppm of Cd
- 2086 ppm of Zn and had an Na/P ratio of 0.47.

The filter cake contained:
- 38.3% of Pb
- 12.0% of Cd
- 13.9% of Zn
- 0.14% of Fe
- 31.7% of total S (of which 16.2% was sulfide S)
- 2.2% of $P_2O_5$.

Example 3 (Comparison Example)

From the recipient vessel 1 (compare the FIGURE), 41.5 l/h of phosphoric acid which contained
- 29.2% by weight of $P_2O_5$
- 584 ppm of Pb
- 182 ppm of Cd
- 2780 ppm of Zn and had an Na/P ratio of 0.30, together with 2.9 l/h of strength by weight sodium hydroxide solution and 1.3 l/h of 5% strength by weight sodium sulfide solution (S add=3.0) were fed to the static mixer 5. The resulting mixture was passed into the first pair of condensers 6 at a temperature of 78° C.; on its exit the mixture had a temperature of 69° C. After passing through the deaerating vessel 9, the mixture was passed at a temperature of 64° C. through the second pair of condensers 11, which it left at a temperature of 39° C. The mixture withdrawn from the collection vessel 14 was filtered.

The filtrate contained
- 27.2% of $P_2O_5$
- 1.8 ppm of Pb
- 0.5 ppm of Cd
- 2185 ppm of Zn and had an Na/P ratio of 0.60.

The filter cake contained:
- 39.2% of Pb
- 12.4% of Cd
- 27.8% of Zn
- 0.25% of Fe
- 23.2% of total S (of which 16.7% was sulfide S)
- 1.8% of $P_2O_5$.

Example 4 (According to the Invention)

From the recipient vessel 1 (compare the FIGURE), 49.3 l/h of the phosphoric acid employed in Example 2 together with 3.7 l/h of 50% strength by weight sodium hydroxide solution and 1.3 l/h of 5% strength by weight sodium sulfide solution (S add=3.1) were fed to the static mixer 5. The resulting mixture was passed into the first pair of condensers 6 at a temperature of 85° C.; on its exit the mixture had a temperature of 60° C. After passing through the deaerating vessel 9, the mixture was passed at a temperature of 58° C. through the second pair of condensers 11, which it left at a temperature of 37° C. The mixture withdrawn from the collection vessel 14 was filtered.

The filtrate contained
- 27.6% of $P_2O_5$
- 4 ppm of Pb
- 0.4 ppm of Cd
- 2185 ppm of Zn and had an Na/P ratio of 0.60.

The filter cake contained:
- 48.2% of Pb
- 15.3% of Cd
- 4.7% of Zn
- 0.1% of Fe
- 29.2% of total S (of which 14.1% was sulfide S)
- 1.9% of $P_2O_5$

Example 5 (According to the Invention)

Into the recipient vessel 1 (compare the FIGURE), in which the phosphoric acid employed in Example 2 was found, were introduced 0.15% was by weight of fine iron turnings which, after stirring for one hour, were completely dissolved with complete reduction of the trivalent iron contained in the phosphoric acid.

Of the phosphoric acid treated in this way, 49.3 l/h together with 3.1l/h of 50% strength by weight sodium hydroxide solution and 0.45 l/h of 5% strength by weight sodium sulfide solution (S add=3.1) were fed to the static mixer 5. The resulting mixture was passed into the first pair of condensers 6 at a temperature of 82° C.; on its exit the mixture had a temperature of 59° C. After passing through the deaerating vessel 9, the mixture was passed at a temperature of 58° C. through the second pair of condensers 11, which it left at a temperature of 36° C. The mixture withdrawn from the collection vessel 14 was filtered.

The filtrate contained
28.7% of $P_2O_5$
3.6 ppm of Pb
0 ppm of Cd
2006 ppm of Zn
and had an Na/P ratio of 0.55.

The filter cake contained:
53.4% of Pb
17.3% of Cd
7.6% of Zn
18.1% of total S (of which 16.9% was sulfide S)
1.5% of $P_2O_5$ Example 6 (According to the Invention)

From the recipient vessel 1 (compare the FIGURE), 51 l/h of the phosphoric acid reductively treated with iron turnings as in Example 5, together with 3.1l/h of 50% strength by weight sodium hydroxide solution and 0.45 l/h of 5% strength by weight sulfide solution (S add=3.0) were fed to the static mixer 5. The resulting mixture was passed into the first pair of condensers 6 at a temperature of 83° C.; on its exit the mixture had a temperature of 60° C. After passing through the deaerating vessel 9, the mixture was passed at a temperature of 59° C. through the second pair of condensers 11, which it left at a temperature of 34° C. The mixture withdrawn from the collection vessel 14 was filtered.

The filtrate contained
28.3% of $P_2O_5$
3.3 ppm of Pb
0.14 ppm of Cd
2138 ppm of Zn
and had an Na/P ratio of 0.55.

The filter cake contained:
49.3% of Pb
22.5% of Cd
5.9% of Zn
17.3% of total S (of which 17.0% was sulfide S)
4.6% $P_2O_5$

We claim:

1. A process for the removal of lead and cadmium from phosphoric acid having a $P_2O_5$ content of up to 32% by weight, an iron content of up to 0.3% by weight and an alkali/P ratio of up to 0.30, which comprises simultaneously introducing alkali solution and aqueous sulfide solution with thorough mixing into the phosphoric acid using a static mixer to form sulfides of lead and cadmium, the quantity of alkali solution being such as to adjust an alkali/P ratio of 0.40 to 0.65 and the quantity of sulfide being added according to the formula:

$$S\ \text{add} = \frac{[S^2]}{[Pb^{2+}] + [Cd^{2+}]}$$

with S add at least 3; adjusting the temperature of the phosphoric acid being thoroughly mixed with alkali solution and sulfide solution to temperatures of 58° to 72° C. with escape of the excess hydrogen sulfide; lowering the temperature to below 45° C. to complete the sulfide precipitation and finally separating off the precipitated sulfides of the lead and cadmium from the phosphoric acid.

2. The process as claimed in claim 1, wherein the alkali solution has a concentration of up to 50% by weight.

3. The process as claimed in claim 1, wherein the sulfide solution contains 2 to 8% by weight of sulfide.

4. The process as claimed in claim 1, wherein the sulfide solution contains 4 to 6% by weight of sulfide.

5. The process as claimed in claim 1, wherein the introduction of alkali solution and sulfide solution is carried out separately and simultaneously underneath the liquid surface of the phosphoric acid.

6. The process as claimed in claim 1, wherein the alkali/P ratio during the sulfide precipitation is 0.45 to 0.55.

7. The process as claimed in claim 1, wherein the separation of the precipitated sulfides is carried out after addition of a flocculating agent.

8. The process as claimed in claim 1, wherein the separation of the sulfides is carried out using a centrifugal separator.

9. A process for the removal of lead and cadmium from phosphoric acid having a $P_2O_5$ content of up to 32% by weight, an iron content of up to 0.3% by weight and an alkali/P ratio of up to 0.30, which comprises adding a reductant to the phosphoric acid; simultaneously introducing alkali solution and aqueous sulfide solution with thorough mixing into the phosphoric acid using a static mixer to form sulfides of lead and cadmium, the quantity of alkali solution being such as to adjust an alkali/P ratio of 0.40 to 0.65 and the quantity of sulfide being added according to the formula:

$$S\ \text{add} = \frac{[S^{2-}]}{[Pb^{2+}] + [Cd^{2+}]}$$

with S add at least 3; adjusting the temperature of the phosphoric acid being thoroughly mixed with alkali solution and sulfide solution to temperatures of 58° to 72° C. with escape of the excess hydrogen sulfide; lowering the temperature to below 45° C. to complete the sulfide precipitation and finally separating off the precipitated sulfides of the lead and cadmium from the phosphoric acid.

10. The process as claimed in claim 9, wherein the reductant used is zero-valent iron.

11. The process as claimed in claim 9, wherein the alkali solution has a concentration of up to 50% by weight.

12. The process as claimed in claim 9, wherein the sulfide solution contains 2 to 8% by weight of sulfide.

13. The process as claimed in claim 9, wherein the sulfide solution contains 4 to 5% by weight of sulfide.

14. The process as claimed in claim 9, wherein the introduction of alkali solution and sulfide solution is carried out separately and simultaneously underneath the liquid surface of the phosphoric acid.

15. The process as claimed in claim 9, wherein the alkali/P ratio during the sulfide precipitation is 0.45 to 0.55.

16. The process as claimed in claim 9, wherein the separation of the precipitated sulfides is carried out after addition of a flocculating agent.

17. The process as claimed in claim 16, wherein the separation of the sulfides is carried out using a centrifugal separator.

* * * * *